US008482577B2

(12) United States Patent
Kim et al.

(10) Patent No.: US 8,482,577 B2
(45) Date of Patent: Jul. 9, 2013

(54) METHOD FOR CONTROLLING OUTPUT OF DISPLAY UNIT AND SYSTEM ENABLING OF THE METHOD

(75) Inventors: Hong Su Kim, Gumi-Si (KR); In Hoon Kim, Gumi-Si (KR)

(73) Assignee: LG Electronics Inc., Seoul (KR)

( * ) Notice: Subject to any disclaimer, the term of this patent is extended or adjusted under 35 U.S.C. 154(b) by 755 days.

(21) Appl. No.: 12/444,955

(22) PCT Filed: Oct. 11, 2007

(86) PCT No.: PCT/KR2007/004982
§ 371 (c)(1), (2), (4) Date: Apr. 15, 2010

(87) PCT Pub. No.: WO2008/044886
PCT Pub. Date: Apr. 17, 2008

(65) Prior Publication Data

US 2010/0201715 A1 Aug. 12, 2010

(30) Foreign Application Priority Data

Oct. 11, 2006 (KR) ........................ 10-2006-0099000

(51) Int. Cl.

| | |
|---|---|
| ***G09G 5/00*** | (2006.01) |
| ***G09G 5/36*** | (2006.01) |
| ***G06T 1/60*** | (2006.01) |
| ***H04N 7/00*** | (2006.01) |
| ***H04N 5/00*** | (2006.01) |
| ***H04N 5/52*** | (2006.01) |
| ***H04N 1/40*** | (2006.01) |
| ***H04N 1/46*** | (2006.01) |
| ***G06K 9/40*** | (2006.01) |
| ***G06K 9/60*** | (2006.01) |

(52) U.S. Cl.
USPC ........... 345/600; 345/581; 345/611; 345/619; 345/530; 345/548; 348/460; 348/476; 348/552; 348/607; 348/683; 358/530; 358/444; 358/448; 382/254; 382/268; 382/305

(58) Field of Classification Search
USPC ......... 345/418, 421, 428, 581, 611, 618–620, 345/501, 530–531, 538, 545–548, 556, 560, 345/204, 690, 698–699, 20, 58, 63; 348/206, 348/207.1, 222.1, 251–252, 434.1, 432.1, 348/435, 441, 460, 465–466, 476–477, 497, 348/500, 516, 533, 536, 552, 606–607, 625–627, 683, 671, 678, 682; 358/505, 530–533, 537, 443–444, 447–448, 461; 382/254, 256, 266, 268, 274, 276, 305; 710/1, 710/14, 16, 22–23, 268; 711/100
See application file for complete search history.

(56) References Cited

U.S. PATENT DOCUMENTS

2005/0266923 A1* 12/2005 Ishii et al. ....................... 463/40
2006/0077213 A1 4/2006 Li ................................ 345/660

(Continued)

FOREIGN PATENT DOCUMENTS

| | | | |
|---|---|---|---|
| CN | 1776778 | A | 5/2006 |
| JP | 2005-345523 | A | 12/2005 |
| WO | WO 2005/009024 | A2 | 1/2005 |

*Primary Examiner* — Wesner Sajous
(74) *Attorney, Agent, or Firm* — KED & Associates, LLP

(57) ABSTRACT

Disclosed herein are a method for controlling the output of a display unit to meet various requirements of the user, and an output control apparatus employing the same.

15 Claims, 3 Drawing Sheets

U.S. PATENT DOCUMENTS

2006/0103681 A1* 5/2006 Choi et al. .................... 345/661
2006/0176397 A1* 8/2006 Panabaker .................... 348/556
2007/0296727 A1* 12/2007 Kumakawa .................. 345/520

* cited by examiner

METHOD FOR CONTROLLING OUTPUT OF DISPLAY UNIT AND SYSTEM ENABLING OF THE METHOD

TECHNICAL FIELD

The present invention relates to a method for controlling the output of a display unit, and an output control apparatus employing the same, and more particularly, to a method for controlling the output of a display unit to meet various requirements of the user, and an output control apparatus employing the same.

BACKGROUND ART

Nowadays, with the popularization of high definition (HD) broadcasting and the development of broadcasting technologies, there have been proposed various techniques for outputting an image inputted to a display unit. One such input image output technique is an overscan technique.

When a video signal inputted to the display unit is outputted to one screen, black stripes or noise resulting from abnormality of scan lines may appear at the edges of the screen. In order to remove such noise, etc., the overscan technique is used, which enlarges input data beyond the screen, cuts the edges of the enlarged data and outputs the resulting data to the screen.

However, such a conventional display unit is disadvantageous in that it overscans an input image unconditionally. As a result, even though not desired by the user, the conventional display unit cuts a certain portion of the input image and provides the resulting image to the user. Consequently, the conventional display unit outputs an image not desired by the user.

Therefore, in order to solve the above problem with the conventional display unit, when data from an external device for which an overscan operation is not desired by the user is inputted, there is a need to output the inputted data without overscanning it.

DISCLOSURE

Technical Problem

An object of the present invention devised to solve the problem lies on a method for controlling the output of a display unit, wherein information about whether to perform an overscan operation, based on the types of external devices, can be stored as default values or be selected by the user, so that an image can be outputted without performing the overscan operation when an external device for which the overscan operation is not desired by the user is connected to the display unit, and by performing the overscan operation when an external device for which the overscan operation is desired by the user is connected to the display unit, and an apparatus employing the same.

Another object of the present invention devised to solve the problem lies on a method for controlling the output of a display unit, wherein the user prestores information about whether to perform an overscan operation, based on the types of external devices, in storage means, and whether to perform the overscan operation is determined with reference to the storage means when an external device is connected to the display unit, thereby removing the user's inconvenience of having to personally select and input the information about whether to perform the overscan operation whenever an external device is connected to the display unit, and an apparatus employing the same.

Technical Solution

The object of the present invention can be achieved by providing a method for controlling an output of a display unit, comprising: storing label information of one or more external devices for which an overscan operation is not desired, in predetermined storage means; allowing a user to select an external device from which data is to be inputted, and determining label information of the selected external device; and determining whether to perform the overscan operation for the data inputted from the selected external device, with reference to the storage means.

In another aspect of the present invention, provided herein is a method for controlling an output of a display unit, comprising: storing label information of one or more external devices for which an overscan operation is not desired, in predetermined storage means; determining label information of an external device which inputs data to the display unit; and determining whether to perform the overscan operation for the data inputted from the external device, with reference to the storage means.

In another aspect of the present invention, provided herein is an apparatus for controlling an output of a display unit, comprising: storage means for storing label information of one or more external devices for which an overscan operation is not desired; a user interface for allowing a user to select an external device from which data is to be inputted; and a scan selector for determining label information of the selected external device, and determining whether to perform the overscan operation for the data inputted from the selected external device, with reference to the storage means.

In yet another aspect of the present invention, provided herein is an apparatus for controlling an output of a display unit, comprising: storage means for storing label information of one or more external devices for which an overscan operation is not desired; and a scan selector for determining label information of an external device which inputs data to the display unit, and determining whether to perform the overscan operation for the data inputted from the external device, with reference to the storage means.

ADVANTAGEOUS EFFECTS

According to the present invention, information about whether to perform an overscan operation, based on the types of external devices, can be stored as default values or be selected by the user. Therefore, when an external device for which the overscan operation is not desired by the user is connected to a display unit, an image can be outputted without performing the overscan operation.

In addition, according to the present invention, the user prestores the information about whether to perform the overscan operation, based on the types of external devices, in storage means, and whether to perform the overscan operation is determined with reference to the storage means when an external device is connected to the display unit. Therefore, it is possible to remove the user's inconvenience of having to personally select and input the information about whether to perform the overscan operation whenever an external device is connected to the display unit.

DESCRIPTION OF DRAWINGS

The accompanying drawings, which are included provide a further understanding of the invention, illustrate embodiments of the invention and together with the description serve to explain the principle of the invention.

In the drawings.

BEST MODE

Reference will now be made in detail to the preferred embodiments of the present invention, examples of which are illustrated in the accompanying drawings.

Figure 1:
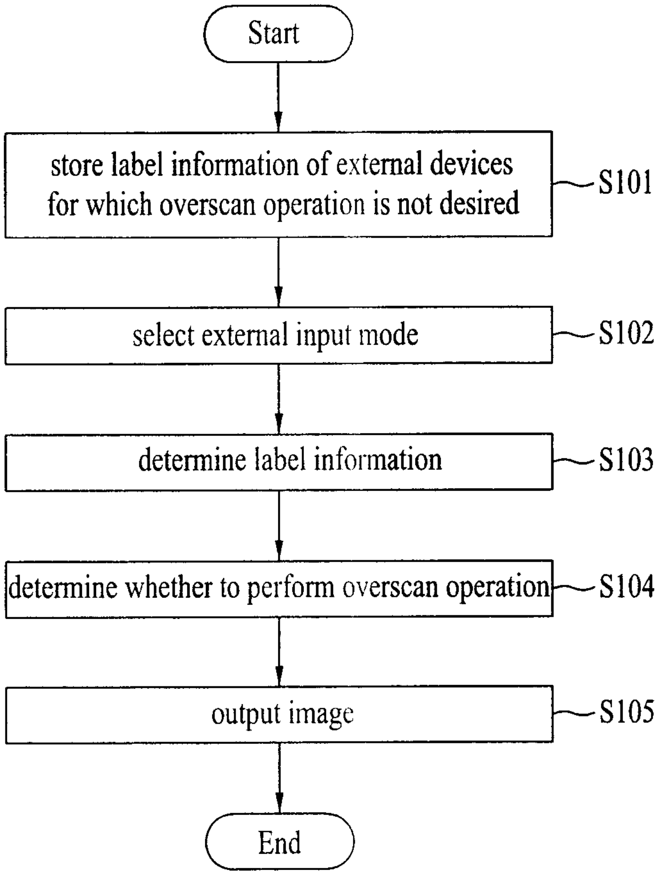
FIG. 1 is a flowchart illustrating a process of controlling the output of a display unit according to one embodiment of the present invention.

FIG. 1 is a flowchart illustrating a process of controlling the output of a display unit according to one embodiment of the present invention.

Referring to FIG. 1, an apparatus for controlling the output of the display unit according to the present invention stores and maintains label information of external devices for which an overscan operation is not desired, in predetermined storage means, at step S101.

In the present embodiment, the label information is predetermined data for identification of the external devices. Alternatively, the label information may be predetermined data including information about whether to perform the overscan operation. The storage means includes all means capable of storing and maintaining the predetermined data.

The label information of the external devices for which the overscan operation is not desired may be default values, or may be selected, inputted and set by the user.

For example, where an external device is a personal computer (PC), the output control apparatus may store label information indicating that the overscan operation is not desired for the external device. In this case, the label information corresponding to the PC may be a default value, or a value selected and inputted by the user through a user interface.

Figure 3:
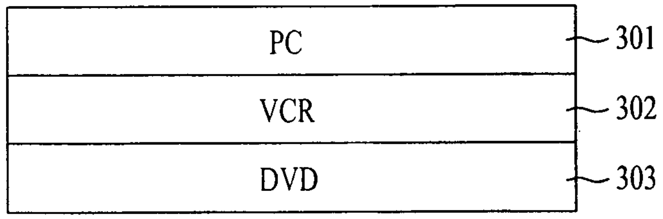
FIG. 3 is a view showing one embodiment of storage means which stores label information of external devices for which the overscan operation is not desired according to the present invention.

FIG. 3 shows one embodiment of storage means which stores label information of external devices for which the overscan operation is not desired according to the present invention. Referring to FIG. 3, the storage means stores and maintains the label information, which are default values or are selected and inputted by the user, as indicated by reference numerals 301, 302 and 303.

For example, the reference numeral 301 may denote label information set as a default value, and the reference numerals 302 and 303 may denote label information selected and inputted by the user.

The selection and input by the user may mean that, through the user interface, the user selects the type of an external device and selects and inputs label information indicating that the overscan operation is not desired for the selected external device.

As an alternative, the output control apparatus may store label information of external devices for which the overscan operation is desired, in the storage means. In this case, similarly, the label information may be default values, or may be selected and inputted by the user.

At step S102, the output control apparatus receives an external input mode selected and inputted by the user. The external input mode is a mode in which, when the display unit is connected with an external device, it outputs data received from the external device.

The user can select the external input mode using a remote controller, etc. In addition, the user, after selecting the external input mode, can select an external device from which data is to be received, through the user interface.

For example, the user may select 'RGB' as the external input mode, and then a PC as the external device from which data is to be received, through the user interface.

At step S103, the output control apparatus determines label information of the external device selected by the user. For example, where the user selects 'PC' as label information of an external device connected through an RGB cable or HDMI cable to the display unit, the output control apparatus determines that the label information of the external device from which data is received is the 'PC'.

At step S104, the output control apparatus determines whether to perform the overscan operation for the external device selected by the user, with reference to the storage means. Alternatively, the output control apparatus may determine the external device from which data is received and then determine whether to perform the overscan operation for the external device from which data is received, with reference to the storage means. For example, the output control apparatus determines that the label information of the external device from which data is received is 'PC' and then determines whether to perform the overscan operation for a PC.

After determining whether to perform the overscan operation with reference to the label information stored in the storage means, the output control apparatus outputs an image by performing the overscan operation or without performing the overscan operation according to a result of the determination at step S105.

Figure 2:
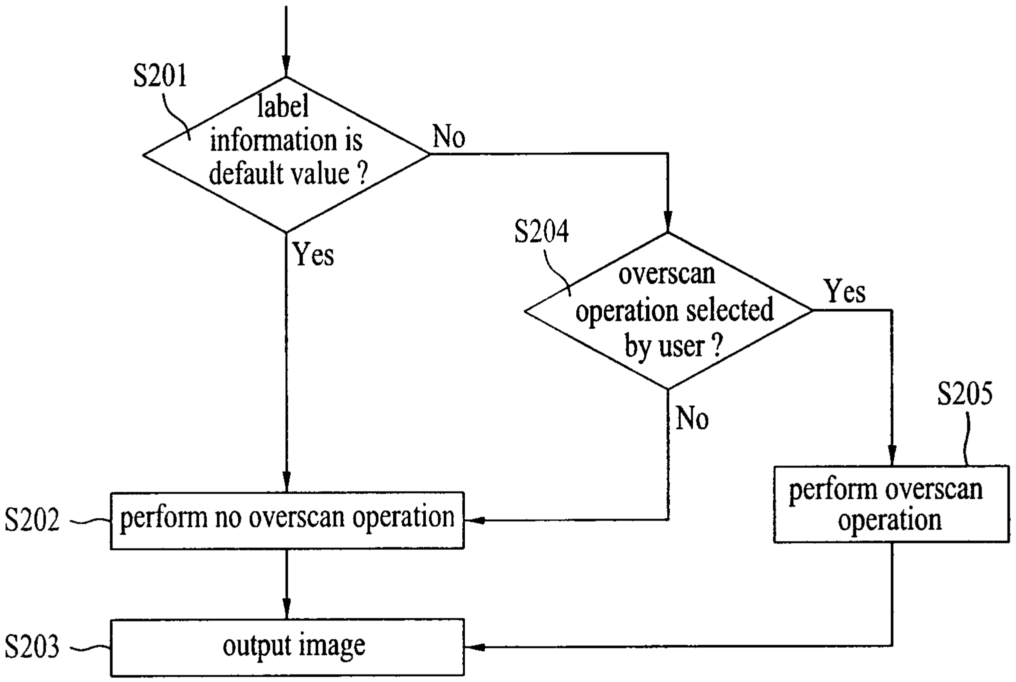
FIG. 2 is a flowchart illustrating in detail a process of determining whether to perform an overscan operation according to one embodiment of the present invention.

FIG. 2 is a flowchart illustrating in detail a process of determining whether to perform the overscan operation according to one embodiment of the present invention. Referring to FIG. 2, at step S201, with reference to the storage means, the output control apparatus determines whether label information corresponding to a selected external device has been stored in the storage means as a default value. For example, where an external device from which external input data is received is a PC, the output control apparatus determines whether label information corresponding to the PC has been stored in the storage means as a default value.

Upon determining at step S201 that the label information has been stored in the storage means as a default value, the output control apparatus determines that the overscan operation is not desired for the selected external device, and then outputs an image at step S203 without performing the overscan operation at step S202.

If it is determined at step S201 that the label information has not been stored in the storage means as a default value, the output control apparatus determines at step S204 whether the label information of the external device corresponds to label information, not stored in the storage means due to selection of the overscan operation for the external device by the user.

Upon determining at step S204 that the label information of the external device corresponds to label information, stored in the storage means due to non-selection of the overscan operation for the external device by the user, the output control apparatus Outputs an image at step S203 without performing the overscan operation at step S202.

If it is determined at step S204 that the label information of the external device corresponds to label information, not stored in the storage means due to selection of the overscan operation for the external device by the user, the output control apparatus outputs an image at step S203 by performing the overscan operation at step S205.

As described above, according to the present invention, information about whether to perform the overscan operation, based on the types of external devices, can be stored as default values or be selected by the user. Therefore, when an external device for which the overscan operation is not desired by the user is connected to the display unit, an image can be outputted without performing the overscan operation.

Further, according to the present invention, the user prestores the information about whether to perform the overscan operation, based on the types of external devices, in the storage means, and whether to perform the overscan operation is determined with reference to the storage means when an external device is connected to the display unit. Therefore, it is possible to remove the user's inconvenience of having to personally select and input the information about whether to perform the overscan operation whenever an external device is connected to the display unit.

For example, assume that label information 'PC' of a PC is stored in the storage means as a default value, label information 'VCR' of a video cassette recorder (VCR) is selected, inputted and stored in the storage means by the user (or information indicating that the overscan operation is not desired for the VCR is stored in the storage means), and label information 'DVD' of a digital versatile disc (DVD) is not stored in the storage means (or information indicating that the overscan operation is desired for the DVD is stored in the storage means). In this case, where the user selects the 'PC' as label information of an external device connected through the RGB cable or HDMI cable to the display unit, the output control apparatus outputs an image received from the PC without overscanning it.

Similarly, in the above case, where the user selects the 'VCR' as label information of an external device connected through the RGB cable or HDMI cable to the display unit, the output control apparatus outputs an image received from the VCR without overscanning it.

On the other hand, in the above case, where the user selects the 'DVD' as label information of an external device connected through the RGB cable or HDMI cable to the display unit, the output control apparatus overscans and outputs an image received from the DVD.

In other embodiments, the output control apparatus may be set to or not to overscan an image received from an external device corresponding to label information not stored in the storage means.

For example, in the case where label information corresponding to a selected external device is not included in label information of external devices for which the overscan operation is not desired, the output control apparatus may determine that the overscan operation will be performed for the selected external device.

Alternatively, in the case where label information corresponding to a selected external device is not included in label information of external devices for which the overscan operation is desired, the output control apparatus may determine that the overscan operation will not be performed for the selected external device.

Figure 4:
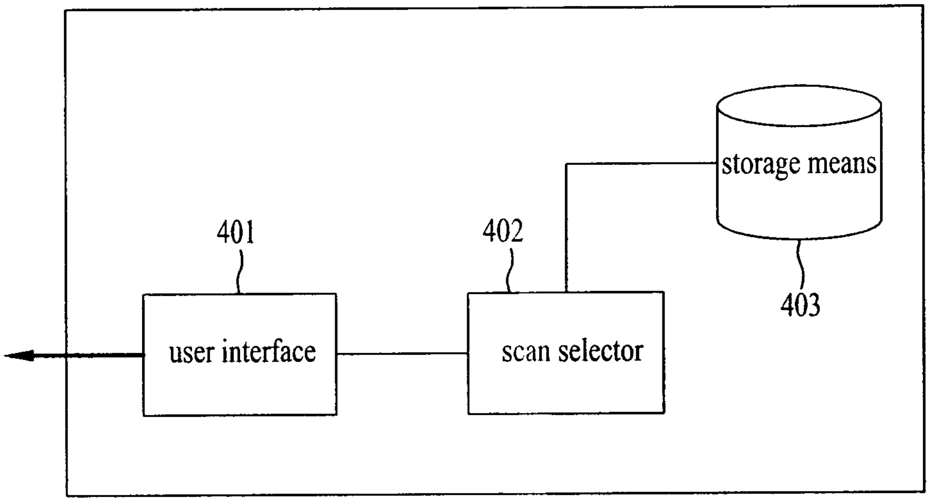
FIG. 4 is a block diagram showing the configuration of an output control apparatus according to one embodiment of the present invention.

FIG. 4 is a block diagram showing the configuration of an output control apparatus according to one embodiment of the present invention. Referring to FIG. 4, the output control apparatus according to this embodiment includes a user interface 401, a scan selector 402, and storage means 403.

The storage means 403 stores label information of external devices for which the overscan operation is not desired.

The label information of the external devices for which the overscan operation is not desired may be default values, or may be selected and inputted by the user. For example, label information of an external device for which the overscan operation is not desired may be 'PC'.

The user interface 401 allows the user to select an external device.

The scan selector 402 determines label information of an external device selected by the user or an external device from which external input data is received, and determines whether to perform the overscan operation for the external device with reference to the storage means 403.

The scan selector 402 can read the label information of the selected external device or the external device from which external input data is received, and determine whether to perform the overscan operation for the external device with reference to the label information stored in the storage means 403.

At this time, where the label information of the selected external device or the external device from which external input data is received is not included in the label information of the external devices for which the overscan operation is not desired, the output control apparatus can determine that the overscan operation will be performed for the external device.

Because the output control apparatus for the display unit according to the present invention has been described and the technical contents described in the above embodiments can be applied to the output control apparatus of FIG. 4 as they are, a detailed description of the output control apparatus of FIG. 4 will thus be omitted.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

[Mode For Invention]

Various embodiments have been described in the best mode for carrying out the invention.

[Industrial Applicability]

As apparent from the above description, the present invention provides a method for controlling the output of a display unit to meet various requirements of the user, and an output control apparatus employing the same.

The invention claimed is:

1. A method for controlling a display unit, comprising:

storing label information of one or more external devices for which an overscan operation is not desired, in a predetermined storage, wherein the label information of one or more external devices for which an overscan operation is not desired is set according to default values and user input;

allowing a user to select an external device from the one or more external devices connected to the display unit;

receiving data from the selected external device onto the display unit; and performing the overscan operation for the data received from the selected external device when the label information of the selected external device is not included in the label information of the one or more external devices for which the overscan operation is not desired.

2. The method according to claim 1, wherein the one or more external devices for which the overscan operation is not desired include a personal computer (PC).

3. The method according to claim 1, wherein an image is output from the display unit after the performing of the overscan operation.

4. The method according to claim 1, wherein an image is output from the display unit without the overscan operation being performed.

5. The method according to claim 1, wherein an output image is displayed on the display unit based on the data received from the selected external device.

6. An apparatus for controlling a display unit, comprising:

storage means configured to store label information of one or more external devices for which an overscan operation is not desired, wherein the label information of one or more external devices for which an overscan operation is not desired is set according to default values and user input;

a user interface configured to allow a user to select an external device from the one or more external devices connected to the display unit;

a receiving unit configured to receive data from the selected external device onto the display unit; and a scan selector configured to perform the overscan operation for the data received from the selected external device when the label information of the selected external device is not included in the label information of the one or more external devices for which the overscan operation is not desired.

7. The apparatus according to claim 6, wherein the one or more external devices for which the overscan operation is not desired include a PC.

8. The apparatus according to claim 6, wherein the display unit outputs an image after the scan selector performs the overscan operation.

9. The apparatus according to claim 6, wherein the display unit outputs an image without the scan selector performing the overscan operation.

10. The apparatus according to claim 6, wherein the display unit displays an output image based on the data received from the selected external device.

11. An apparatus for controlling a display, comprising:

a storage device to store label information of a plurality of external devices for which an overscan operation is not desired, wherein the stored label information of the plurality of external devices for which an overscan operation is not desired is based on at least a default value or a user input;

a user interface to select an external device from the plurality of external devices coupled to the display;

a receiving unit to receive data from the selected external device for the display; and a scan selector to perform the overscan operation for the data received from the selected external device when the label information of the selected external device is not included in the label information of the plurality of external devices for which the overscan operation is not desired.

12. The apparatus according to claim 11, wherein at least one of the plurality of external devices includes a computer.

13. The apparatus according to claim 11, wherein the display unit outputs an image after the scan selector performs the overscan operation.

14. The apparatus according to claim 11, wherein the display unit outputs an image without the scan selector performing the overscan operation.

15. The apparatus according to claim 11, wherein the display unit displays an output image based on the data received from the selected external device.

* * * * *